Patented Apr. 12, 1938

2,113,566

UNITED STATES PATENT OFFICE 2,113,566

AROMATIC MERCURY SALTS OF ALDEHYDO AND KETONIC ACIDS

Carl N. Andersen, Wellesley Hills, Mass., assignor to Lever Brothers Company, a corporation of Maine No Drawing. Application January 21, 1936, Serial No. 60,069. Renewed May 19, 1937

15 Claims. (Cl. 260—13)

The present invention relates to aromatic mercury compounds, and more particularly to aromatic mercury salts of acids containing a carbonyl group, i. e., aldehydo and ketonic acids.

It is an object of my invention to produce new aromatic mercury salts of aldehydo and ketonic acids useful as germicides, and for other therapeutic purposes.

I have discovered that when the acidic hydrogen atom or atoms of aldehydo acids and ketonic acids are replaced by the essential radical of certain aromatic mercury compounds, compounds are produced which have an extraordinarily high potency as a germicide, and at the same time are characterized by relatively low toxicity and other desirable properties.

The compounds I have prepared may be described as having the general formula $(RHg)_xR_1$, in which R represents an aromatic structure, to a carbon atom of which the mercury is directly attached; in which $R_1$ represents a radical of an acid containing a carbonyl group, i. e., an acid of the class comprising the aldehydo and ketonic acids; and in which $x$ represents the number of hydrogen atoms in the acid radical that have been replaced by the RHg group or groups. The RHg group or groups is linked to the radical $R_1$ through the replacement of the acidic hydrogen atom or atoms.

While the word "group" is used hereinafter, it is understood that it must be interpreted as plural when the value of $x$ is more than one.

More particularly, R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as, for example, polycyclic hydrocarbons in which all of the nuclear carbons, other than the one attached to mercury, and any side chain carbon atoms, have their valences satisfied either by carbon or hydrogen. Examples are the diphenyl, tolyl, xylyl and naphthyl groups.

The radical $R_1$ represents any acid containing a carbonyl group (other than in the acidic group). If the carbonyl group is attached to a primary carbon atom, or an atom adjacent to that which the acidic group is linked, the acid is generally referred to as an aldehydo acid. If the carbonyl group is linked to a carbon atom other than a primary carbon atom, the acid is generally referred to as a ketonic acid. The aldehydo and ketonic acids may be either cyclic or acyclic, and the two most important classes of these acids at the present time are the aliphatic and aromatic acids. The acids also may be either saturated or unsaturated, and may be either mono or polybasic. In the latter case one or more of the acidic hydrogens may be replaced by the RHg radical.

Examples of acids of the above defined group include: glyoxalic acid, glycuronic acid, b-formyl acrylic acid, laevulinic acid, aceto acetic acid, pyruvic acid, b-aceto acrylic acid, acetone dicarboxylic acid, oxalacetic acid, oxalcrotonic acid, opianic acid, o-phthaldehydic acid, phenylene aldehydo carboxylic acids, 2-aldehydo isophthalic acid, benzoyl acetic acid, benzoyl benzoic acid, phenyl glyoxalic acid, b-benzoyl propionic acid, hippuric acid, 1-chlor anthraquinone 2 carboxylic acid, b-benzoyl acrylic acid, and phthalonic acid.

The compounds I have prepared, together with others I have investigated, comprise a sufficiently representative number of the aldehydo and ketonic acids to lead me to believe that all of the acids in this general group may be employed to produce my novel mercury compounds. The compounds so prepared have in greater or lesser degree, but always in a relatively high degree, desirable germicidal properties, and I, therefore, regard my invention as generic to and including the entire group of RHg type salts of aldehydo and ketonic acids.

The general method of producing these compounds consists in reacting together an aldehydo or ketonic acid, and a compound containing an aromatic mercury radical of the above defined type. A common solvent for both reacting components is employed. The compound resulting from the reaction is relatively insoluble as compared with the reacting components, and upon its precipitation may be filtered, washed and dried.

In my application Serial No. 694,198, filed October 18, 1933, I have disclosed a general method of preparing aromatic mercury compounds of this type by reacting the acidic compound with an aromatic mercury hydroxide. This reaction is one of neutralization of an acid and a base to form a salt and water. This has the advantage that water is the only other product produced and the resulting compound may be easily purified.

In my application Serial No. 694,199, filed October 18, 1933, I have disclosed another general method of preparing aromatic mercury compounds of this type by employing a soluble aromatic mercury salt, for example, the acetate or lactate, in a reaction with the acidic compound. The aromatic mercury compounds produced are of a relatively low solubility as compared with the aromatic mercury salts and are relatively insoluble as compared with the acidic compound.

In my application Serial No. 50,001, filed November 15, 1935, I have disclosed a method of preparing aromatic mercury compounds by reacting an acid derivative, such as an ester or anhydride with an aromatic mercury hydroxide to form the corresponding aromatic mercury salt.

Any of these general methods may be employed in producing compounds comprising this invention.

The following examples are given as illustrative of a method by which all of the compounds comprising this invention may be prepared and as illustrative of representative organic mercury derivatives falling within the scope of my invention:

*Example 1*

17.64 grams of phenylmercury hydroxide is dissolved in 500 cc. of water and heated until solution is complete. The solution is filtered and to the filtrate is added 15.64 grams of 66% glycuronic acid. A precipitate is formed which is separated by filtration. From the mother liquor a light yellow amorphous mass separates. This is separated by filtration, washed and dried at 50° C. This light yellow material upon heating darkens below 100° C. and decomposes with the evolution of gas at 130° C. The material is the compound phenylmercury glycuronate.

*Example 2*

5.88 grams of phenylmercury hydroxide is dissolved in 2 liters of water. The solution is filtered to remove any gums or other insoluble materials present. To the filtrate is added 2.55 grams of laevulinic acid in 20 cc. of water. The mixture is allowed to stand for 24 hours, when a small precipitate has formed. The mixture is then evaporated to one-third of its original volume and then is allowed to cool and stand until precipitation is complete. The precipitate is then separated, washed, and dried. It is then dissolved in benzene and recrystallized from water. The recrystallization may take place from alcohol or another suitable medium, if desired. This material has a melting point of 92–94° C. and is the compound phenylmercury laevulinate.

*Example 3*

17.64 grams of phenylmercury hydroxide is dissolved in 4 liters of water. The solution is filtered and to the filtrate is added 9.9 grams of pyruvic (pyroracemic) acid in 25 cc. of water. The mixture is allowed to stand for 12 hours and a very small precipitate is formed. The volume is then concentrated to bring down the major portion of the salt formed. The precipitate is then separated, washed and dried; upon heating the material it begins to decompose at about 139° C. and partially melts at 144° C.; it is the compound phenylmercury pyruvate.

*Example 4*

35.28 grams of phenylmercury hydroxide is dissolved in 4 liters of water and heated until solution is complete. The solution is filtered to remove any insoluble material. To the filtrate is added 9.63 grams of acetone dicarboxylic acid. A milky solution results and white flaky crystals separate. The mixture is allowed to cool and the precipitate separated by filtration, washed with alcohol and dried. The material is found to have a melting point of 153–161° C. and is the compound phenylmercury acetone dicarboxylate.

*Example 5*

17.64 grams of phenylmercury hydroxide is dissolved in 800 cc. of water and heated until solution is complete. The solution is filtered to remove any insoluble material. To the filtrate is added 12.6 grams of opianic acid dissolved in 200 cc. of alcohol. A clear solution results on cooling, and a gum precipitates. The gum is separated from the solution and dissolved in alcohol from which white crystals separate. The crystals are separated by decantation and washed with alcohol and dried. Upon recrystallization of the material from alcohol, it is found to have a melting point of 146–147° C., and is the compound phenylmercury opianate.

*Example 6*

17.64 grams of phenylmercury hydroxide is dissolved in 2 liters of water and heated until solution is complete. The solution is filtered to remove any insoluble material. To the filtrate is added 12.12 grams of b-benzoyl acrylic acid. The mixture is allowed to stand and a white crystalline mass separates. This is separated by filtration, washed well with warm water and dried. The material has a melting point of 139–141° C. and is the compound phenylmercury b-benzoyl acrylate.

*Example 7*

35.28 grams of phenylmercury hydroxide is dissolved in 4 liters of water and heated until solution is complete. The solution is filtered to remove any insoluble material. To the filtrate is added 29.83 grams of o-benzoyl benzoic acid dissolved in 50 cc. of alcohol. The mixture is allowed to stand and cool and a crystalline mass separates at the bottom. It is separated by filtration, washed well with warm water and dried. Upon heating the material it softens at 52° C. and melts at 52–70° C. It is the compound phenylmercury o-benzoyl benzoate.

*Example 8*

17.64 grams of phenylmercury hydroxide is dissolved in one-half liter of water and heated until solution is complete. The solution is filtered to remove any insoluble material. To the filtrate is added 10.68 grams of b-benzoyl propionic acid dissolved in 100 cc. of alcohol. The solution is evaporated to a small volume and allowed to stand. A white granular solid separates. The mixture is filtered and the solid is redissolved and recrystallized from alcohol. It has a melting point of 99° C. and is the compound phenylmercury b-benzoyl propionate.

*Example 9*

17.64 grams of phenylmercury hydroxide is dissolved in 500 cc. of water and heated until solution is complete. The solution is filtered to remove any insoluble material. To the filtrate is added 17.28 grams 1-chlor 2-carboxy anthraquinone. A light yellow precipitate results which is separated by filtration and recrystallized twice from alcohol. Upon heating the material it is found to decompose at 202-205° C. It is the compound phenylmercury 1-chlor anthraquinone 2-carboxylate.

*Example 10*

35.28 grams of phenylmercury hydroxide is dissolved in two liters of water and heated until solution is complete. The solution is filtered to remove any insoluble material. To the filtrate is added 15.6 grams of ethylaceto acetate (aceto acetic acid ethyl ester). The mixture is heated and a precipitate forms. The mixture is allowed to cool and the precipitate is separated by filtration, washed well with warm water and dried. The material has a melting point of 197-205° C. with decomposition, and is the compound phenylmercury acetoacetate. In this reaction the ester is hydrolized to yield the acid which reacts with the hydroxide.

The reacting materials are employed in substantially theoretical quantities. In some cases, if desired, approximately 10% excess of the acid or acid derivative may be employed in order to insure a complete conversion of the phenylmercury compound.

Any suitable solvent in which the reacting components are soluble may be used as the medium for carrying out the reaction. If they are both soluble in water this is generally used for reasons of convenience, but if not, other solvents such as the alcohols or acetone or mixtures of these with each other or with water, may be employed.

The process may be carried out at any temperature, for example, room temperature. In most cases I find, however, that the use of heat facilitates the solution of the reaction components and speeds the reaction.

From the description of the specific examples, it will be readily apparent to one skilled in the art how any other members of the group of aldehydo and ketonic acids may be reacted with an aromatic mercury compound to produce the other mercury compounds of analogous structure which are within the scope of my invention.

The compounds produced as above described are characterized by extraordinarily high potency as antiseptics and germicides. Tests to determine the efficacy of some of them in killing *B. typhosus* and *Staph. aureus* were carried out under the following conditions:

Aqueous solutions of varying dilutions from 1:10,000 upward until killing ceased, were made up.

These dilutions were employed in the conduct of tests by the following methods:

Circular 198, U. S. Dept. of Agriculture, Dec. 1931, described as F. D. A. Method against *Eberthella typhi* (typhoid bacillus) at 37° C. and F. D. A. Special method against *Staph. aureus* at 37° C.

As illustrative of the potency of the compounds, the killing power of the following compounds is given merely for illustration.

The figures represent the maximum dilutions at which killing in 15 minutes resulted:

| | B. typhosus | Staph. aureus |
|---|---|---|
| Phenylmercury laevulinate | 1:100,000 | 1:30,000 |
| Phenylmercury b-benzoyl acrylate | 1:120,000 | 1:50,000 |

The above compounds are also characterized by relatively low toxicity. Because of this and their higher germicidal properties, it makes it possible to use them in germicidal preparations in extreme dilutions.

When the compounds are employed in germicidal preparations they may be dissolved in any suitable solvent such as water, alcohol, and mixtures thereof, oils, etc. They may be incorporated in soaps, ointments, mouth washes, and other preparations, in a manner well understood in the art.

This application is a continuation-in-part of my prior application Serial No. 694,204, filed October 18, 1933.

I claim:

1. A new organic mercury compound of the general formula $(RHg)_xR_1$, in which R represents an aromatic structure in which none of the carbon atoms has direct linkage with any element other than hydrogen, carbon and mercury; in which $R_1$ represents a radical of an acid containing a carbonyl group other than in the acidic group, which radical is linked to the RHg group through the replacement of acidic hydrogen; and in which $x$ represents the number of acidic hydrogens replaced by the RHg group.

2. A new organic mercury compound of the general formula $(RHg)_xR_1$, in which R represents an aromatic structure in which none of the carbon atoms has direct linkage with any element other than hydrogen, carbon and mercury; in which $R_1$ represents a radical of a dibasic acid containing a carbonyl group other than in the acidic group, which radical is linked to the RHg group through the replacement of acidic hydrogen; and in which $x$ represents the number of acidic hydrogens replaced by the RHg group.

3. A new organic mercury compound of the general formula $(RHg)_xR_1$, in which R represents an aromatic structure in which none of the carbon atoms has direct linkage with any element other than hydrogen, carbon and mercury; in which $R_1$ represents a radical of an aliphatic ketonic dibasic acid, which radical is linked to the RHg group through the replacement of acidic hydrogen; and in which $x$ represents the number of acidic hydrogens replaced by the RHg group.

4. A new organic mercury compound of the general formula $(RHg)_xR_1$, in which R represents an aromatic structure in which none of the carbon atoms has direct linkage with any element other than hydrogen, carbon and mercury; in which $R_1$ represents a radical of an aromatic acid containing a carbonyl group other than in the acidic group, which radical is linked to the RHg group through the replacement of acidic hydrogen; and in which $x$ represents the number of acidic hydrogens replaced by the RHg group.

5. A new organic mercury compound of the general formula $(RHg)_xR_1$, in which R represents an aromatic structure in which none of the carbon atoms has direct linkage with any element other than hydrogen, carbon and mercury; in which $R_1$ represents a radical of an aromatic aldehydo acid, which radical is linked to the RHg group through the replacement of acidic hydrogen; and in which $x$ represents the number of acidic hydrogens replaced by the RHg group.

6. A new organic mercury compound of the general formula $(RHg)_xR_1$, in which R represents an aromatic structure in which none of the carbon atoms has direct linkage with any element other than hydrogen, carbon and mercury; in which $R_1$ represents a radical of an aromatic ketonic acid, which radical is linked to the RHg group through the replacement of acidic hydrogen; and in which $x$ represents the number of acidic hydrogens replaced by the RHg group.

7. A new organic mercury compound of the general formula $(C_6H_5Hg)_xR_1$, in which $R_1$ represents a radical of an acid containing a carbonyl group other than in the acidic group, which radical is linked to the $C_6H_5Hg$ group through the replacement of acidic hydrogen; and in which $x$ represents the number of acidic hydrogens replaced by the $C_6H_5Hg$ group.

8. A new organic mercury compound of the general formula $(C_6H_5Hg)_xR_1$, in which $R_1$ represents a radical of a dibasic acid containing a carbonyl group other than in the acidic group, which radical is linked to the $C_6H_5Hg$ group through the replacement of acidic hydrogen; and in which $x$ represents the number of acidic hydrogens replaced by the $C_6H_5Hg$ group.

9. A new organic mercury compound of the general formula $(C_6H_5Hg)_xR_1$, in which $R_1$ represents a radical of an aliphatic ketonic dibasic acid, which radical is linked to the $C_6H_5Hg$ group through the replacement of acidic hydrogen; and in which $x$ represents the number of acidic hydrogens replaced by the $C_6H_5Hg$ group.

10. A new organic mercury compound of the general formula $(C_6H_5Hg)_xR_1$, in which $R_1$ represents a radical of an aromatic acid containing a carbonyl group other than the acidic group, which radical is linked to the $C_6H_5Hg$ group through the replacement of acidic hydrogen; and in which $x$ represents the number of acidic hydrogens replaced by the $C_6H_5Hg$ group.

11. A new organic mercury compound of the general formula $(C_6H_5Hg)_xR_1$, in which $R_1$ represents a radical of an aromatic aldehydo acid, which radical is linked to the $C_6H_5Hg$ group through the replacement of acidic hydrogen; and in which $x$ represents the number of acidic hydrogens replaced by the $C_6H_5Hg$ group.

12. A new organic mercury compound of the general formula $(C_6H_5Hg)_xR_1$, in which $R_1$ represents a radical of an aromatic ketonic acid, which radical is linked to the $C_6H_5Hg$ group through the replacement of acidic hydrogen; and in which $x$ represents the number of acidic hydrogens replaced by the $C_6H_5Hg$ group.

13. Phenylmercury acetone dicarboxylate.
14. Phenylmercury opianate.
15. Phenylmercury benzoyl benzoate.

CARL N. ANDERSEN.